US005168625A

United States Patent [19]

DeGrace, Jr.

[11] Patent Number: 5,168,625

[45] Date of Patent: Dec. 8, 1992

[54] METHOD OF MAKING FUEL RAIL FOR BOTTOM AND SIDE FED INJECTORS BY EXTRUSION

[75] Inventor: Louis G. DeGrace, Jr., Newport News, Va.

[73] Assignee: Siemens Automotive L.P., Auburn Hills, Mich.

[21] Appl. No.: 832,827

[22] Filed: Feb. 7, 1992

Related U.S. Application Data

[62] Division of Ser. No. 546,476, Jun. 29, 1990, Pat. No. 5,111,794.

[51] Int. Cl.[5] ............ B23P 15/00

[52] U.S. Cl. ............ 29/888.01; 29/428; 123/470; 138/870

[58] Field of Search ............ 29/888.01, 428; 123/456, 470; 239/550; 138/870

[56] References Cited

U.S. PATENT DOCUMENTS

| | | | |
|---|---|---|---|
| 4,205,637 | 6/1980 | Ito et al. | 123/32 AE |
| 4,570,601 | 2/1986 | Ito et al. | 123/468 |
| 4,768,487 | 9/1988 | Yamamoto et al. | 123/470 |
| 4,844,036 | 7/1989 | Bassler et al. | 123/470 |
| 4,895,124 | 1/1990 | Bartholomew | 123/510 |
| 4,950,171 | 8/1990 | Muzslay | 439/76 |
| 5,005,878 | 4/1991 | Smith | 285/319 |
| 5,016,594 | 5/1991 | Hafner et al. | 123/470 |
| 5,030,116 | 7/1991 | Sakai et al. | 439/130 |
| 5,038,738 | 8/1991 | Hafner et al. | 123/470 |
| 5,097,594 | 3/1992 | Daly et al. | 29/888.01 |

*Primary Examiner*—Irene Coda
*Attorney, Agent, or Firm*—George L. Boller; Russel C. Wells

[57] ABSTRACT

A fuel rail for a side- or bottom- fed injector wherein the rail contains conductors, and the injectors are connected to the conductors simultaneously with the insertion of the injectors into through-holes in the rail. The fuel rail is made by extruding material to a desired transverse shape, cutting the material and machinery transverse through holes in the extruded material.

3 Claims, 3 Drawing Sheets

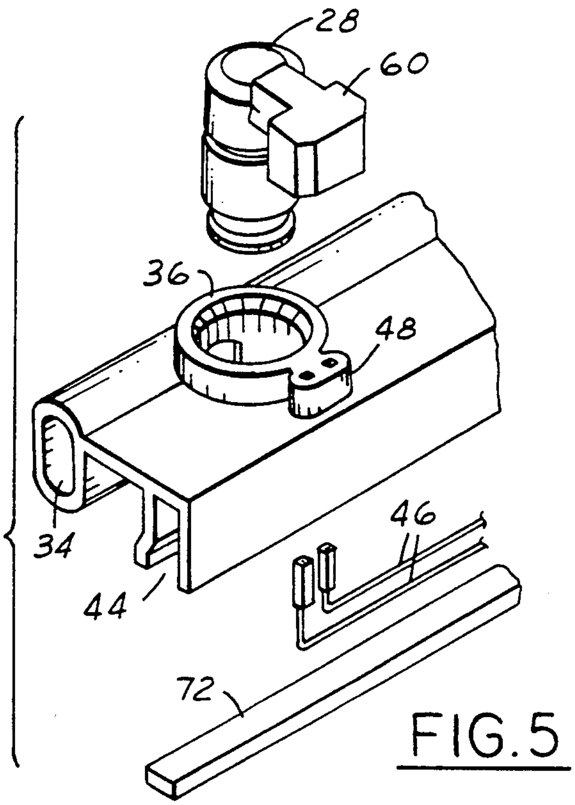
FIG. 5
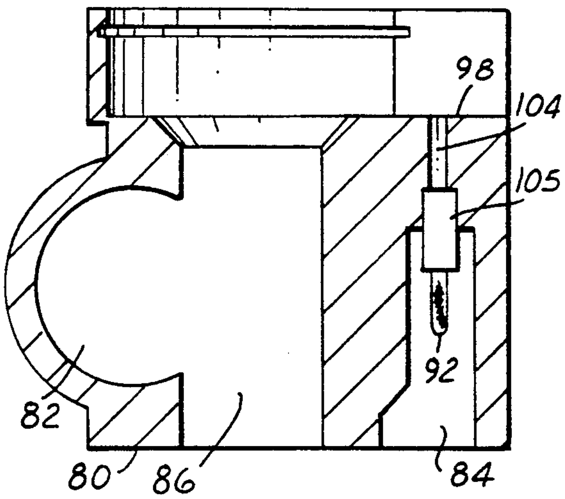
FIG. 7
FIG. 6
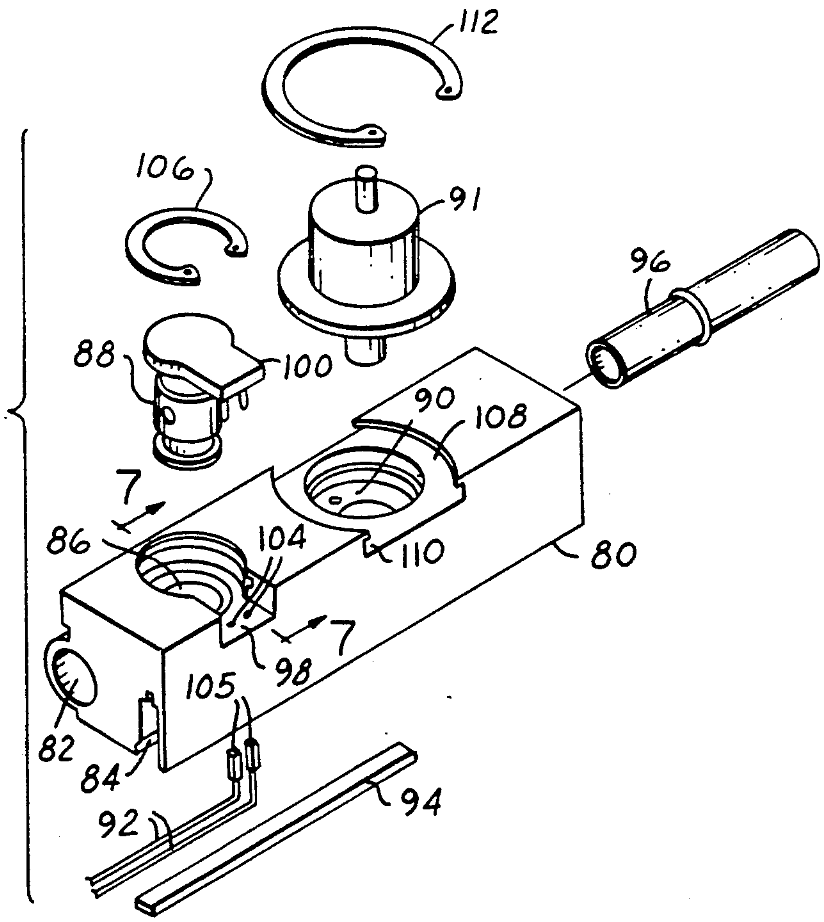

METHOD OF MAKING FUEL RAIL FOR BOTTOM AND SIDE FED INJECTORS BY EXTRUSION

This application is a division of application Ser. No. 546,476, filed Jun. 29, 1990, now U.S. Pat. No. 5,111,794.

BACKGROUND AND SUMMARY OF THE INVENTION

This invention relates to fuel rails for internal combustion engines.

U.S. Pat. No. 4,570,601 dated Feb. 18, 1986 discloses a fuel rail which is suitable for a top feed injector. The fuel rail contains wiring via which the individual injectors are operated from an electronic control unit (ECU) which is located remote from the fuel rail. The rail has an input connector into which a cable from the ECU is plugged. There are fuel outlet ports into which the top feed ends of the injectors are plugged, and immediately adjacent each fuel outlet port is an associated power supply connector. When each fuel injector is plugged into its associated outlet port, the electrical connector on the injector is simultaneously mated with the associated power supply connector.

The present invention relates to a a new and unique mounting for a bottom or a side fed injector on a fuel rail which provides significant advantages over the arrangement for mounting a top feed injector, as proposed in U.S. Pat. No. 4,570,601. In both a side fed and a bottom fed injector, fuel is supplied radially to the injector at a location that is between 0-ring seals that seal the injector to the wall of the hole into which the injector has been inserted. The principal difference between a bottom feed and a side feed is the axial location of the fuel inlet along the length of the injector. One important attribute of the invention is that the complete assembly can be made more transversely compact than that of U.S. Pat. No. 4,570,601. This enables the fuel rail to be packaged within a smaller envelope, and hence endows the rail with the potential for fitting into more crowded and/or smaller engine compartments of automotive vehicles.

Another especially important attribute of the invention is that it is possible for the major portion of the rail assembly to be fabricated by an extrusion process, a manufacturing technique which can yield significant cost economies over a cast, or molded, rail in certain applications.

Other features, advantages, and benefits of the invention will be seen in the ensuing detailed description of a presently preferred embodiment in accordance with the best mode contemplated for carrying out principles of the invention.

Drawings accompany the disclosure and are briefly described as follows.

BRIEF DESCRIPTION OF THE DRAWINGS

FIG. 5 is a view similar to FIG. 2, but of a second embodiment.

FIG. 6 is a view similar to FIG. 2, but of a third embodiment.

FIG. 7 is a transverse cross section taken in the direction of arrows 7—7 in FIG. 6 with the several parts in assembly.

DESCRIPTION OF THE PREFERRED EMBODIMENT

Figure 1:
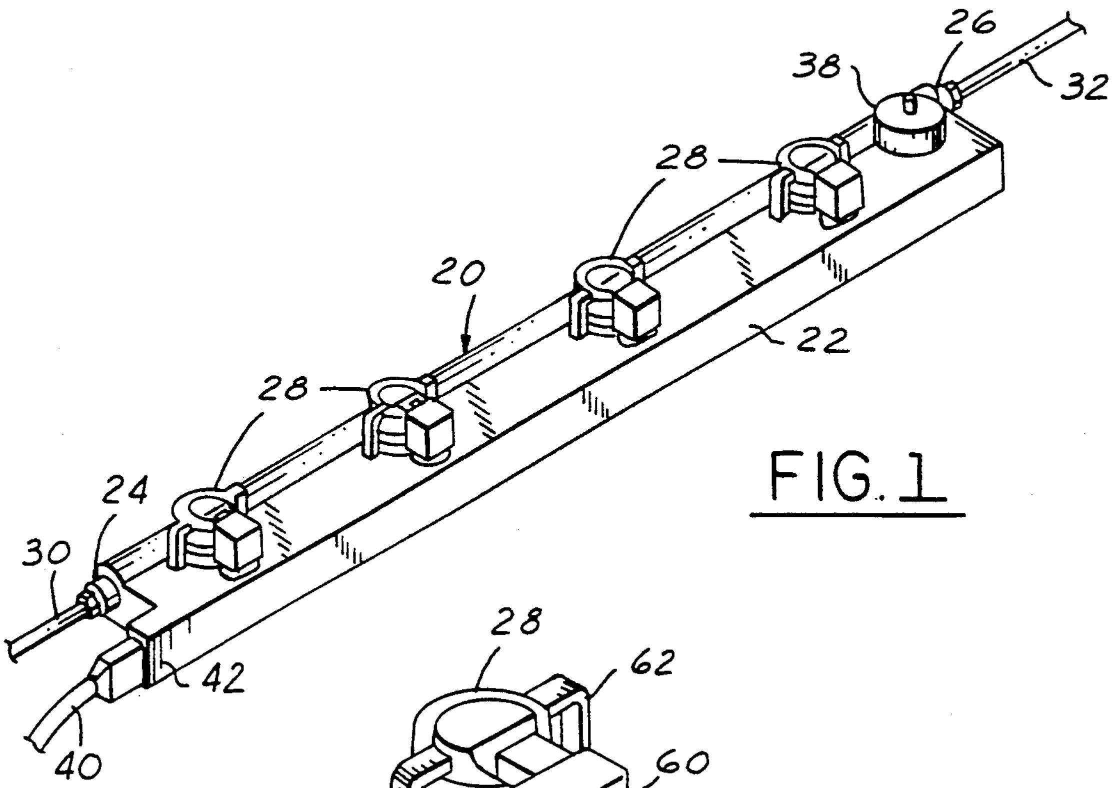
FIG. 1 is a perspective view of a fuel rail assembly in accordance with a first embodiment of the invention.

FIGS. 1–4 present an exemplary fuel rail assembly 20 comprising a main fuel rail 22, a fuel inlet 24, a fuel return 26, and a plurality of electromagnetic fuel injectors 28, there being four injectors in the exemplary embodiment. A fuel inlet tube 30 is fastened to fuel inlet 24, and a fuel return tube 32 is fastened to fuel return 26. Rail 22 comprises a fuel tube 34 extending between inlet 24 and return 26. At the location of each injector 28, rail 22 has a transverse tube structure 36. The tube 34 and tube structure 36 are constructed such that respective wall portions thereof intersect to form an opening 35 providing communication of tube 34 to each tube structure 36. The rail 22 is also constructed to provide for the mounting of a fuel pressure regulator 38 in communication with tube 34 to regulate the pressure of liquid fuel in tube 34.

The fuel injectors 28 are operated by a remotely located ECU (not shown). An electric cable 40 from the ECU is plugged into a mating connector 42 in assembly 20. Within a channel-shaped portion 44 of rail 22 are electrical conductors 46 extending from connector 42 to respective ones of receptacles 48, each of which is associated with a corresponding one of the fuel injectors 28. In other words, there are, in the illustration, eight individual terminals (four pairs) in connector 42, one pair per injector, and each pair is connected by a corresponding pair of conductors 46 to a particular receptacle 48.

Each receptacle 48 is immediately adjacent the axial end of a corresponding one of the tube structures 36. A flange 50 joins tub 34 with channel-shaped portion 44, and it is through flange 50 that the tube structures 36 extend.

Figure 4:
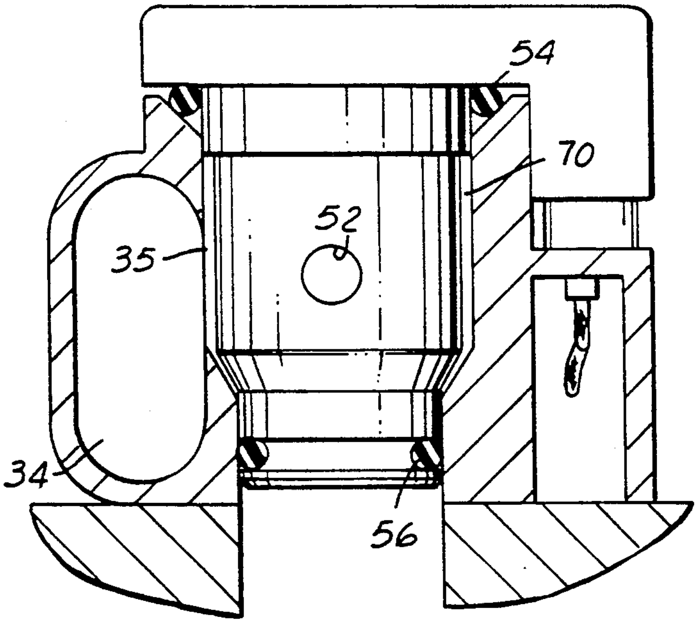
FIG. 4 is an enlarged transverse cross section taken in the direction of arrows 4—4 in FIG. 2.

FIG. 4 best presents how the several parts are related in assembly. Each of the illustrated injectors is of the side feed type. Each injector comprises a generally cylindrical body having one or more fuel inlets 52 in a side wall portion thereof. Said one or more inlets 52 are axially intermediate the ends of the injector and are bounded by axially spaced apart o-ring seals 54, 56 disposed on the injector body. With each injector disposed in its associated tube structure, said seals 54, 56 seal the injector to the tube structure such that the pressure-regulated liquid fuel in tube 34 is communicated to each injector's inlet(s) 52 without said fuel leaking from tube structure 36. In this way pressure-regulated liquid fuel is presented to each injector in the assembly so that when the injector is actuated by an electric signal from the ECU delivered via the pair of terminals in the corresponding receptacle 48, the injector transmits a certain amount of liquid fuel for delivery at its outlet 58 to be sprayed to the associated engine cylinder's inlet.

It is to be observed that each injector 28 comprises an electrical connector 60 having a pair of terminals for mating connection with the corresponding terminals of the corresponding receptacle 48. Connector 60 overhangs the side of the injector and is open in the direction of the fuel outlet end of the injector. A pair of L-shaped catches 62 are located on diametrically opposite sides of each injector and at 90 degrees to the location of the connector 60 about the longitudinal axis of the injector. The catches are adapted for insertion of their free ends into corresponding holes 64 in flange 50 to retain the injector in assembly on the rail. The distal free end of each catch has a hook 66 which coacts with a formation 68 on the outside of the tube structure 36 such that during the process of inserting the injector into the tube structure, the catches are initially resiliently flexed outwardly allowing the catches to enter and pass into holes 64, and once the injector has been fully inserted, the catches relax to cause hooks 66 to lodge behind the formations 68 thereby preventing the injector from being pulled out of the rail. The design of the fuel rail assembly may be such that access for releasing the catches is impossible unless the entire fuel rail assembly is removed from the engine, or alternatively, it may be such that access can be had by use of a suitable tool to release the catches without the necessity of removing the entire fuel rail assembly from the engine. Each possibility has its own particular advantages, and the choice can be specified by the engine manufacturer. While the use of suitable material (suitable plastic) has the advantage of making it possible to mold the catches integrally with the material of the body of connector 60, the catches do not necessarily have to be fabricated in that manner.

In the assembly 20, the two axially spaced apart O-ring seals 54, 56 on each injector are for the purpose of sealing the axial ends of an annular space 70 extending around the injector between the injector and the wall of the tube structure 36. It is this annular space which is communicated to fuel tube 34 via opening 35. Fuel from the fuel tube 34 is therefore supplied to the injector fuel inlet(s) 52. When an injector is operated, fuel is emitted from the injector's outlet 58.

Conductors 46 can be of any conventional construction, for example printed wire. After their assembly into the channel-shaped portion 44, the portion 44 can be enclosed, such as by the conductors being covered by a filler 72. The configuration of the rail 22 makes it possible to package the injector power drivers, or portions thereof, directly on the rail. A channel-shaped area 74 that lies between channel-shaped portion 44 and fuel tube 34 is an ideal location. The conductors 46 and rail can be adapted to provide for the proper electrical circuit connections, while the power driver circuitry, or portion thereof, for each injector can be placed adjacent fuel tube 34 to be cooled by the fuel passing through the fuel tube, and/or in a thermally conductive or convective relationship with ambient air for ambient cooling.

FIG. 5 presents a configuration in which the injector does not embody the catches 62. Separate attaching elements (not shown) are used in this instance. They can be accessible on the exterior to permit the injector to be removed from the rail without having to first disassemble the rail from the engine.

Figure 2:
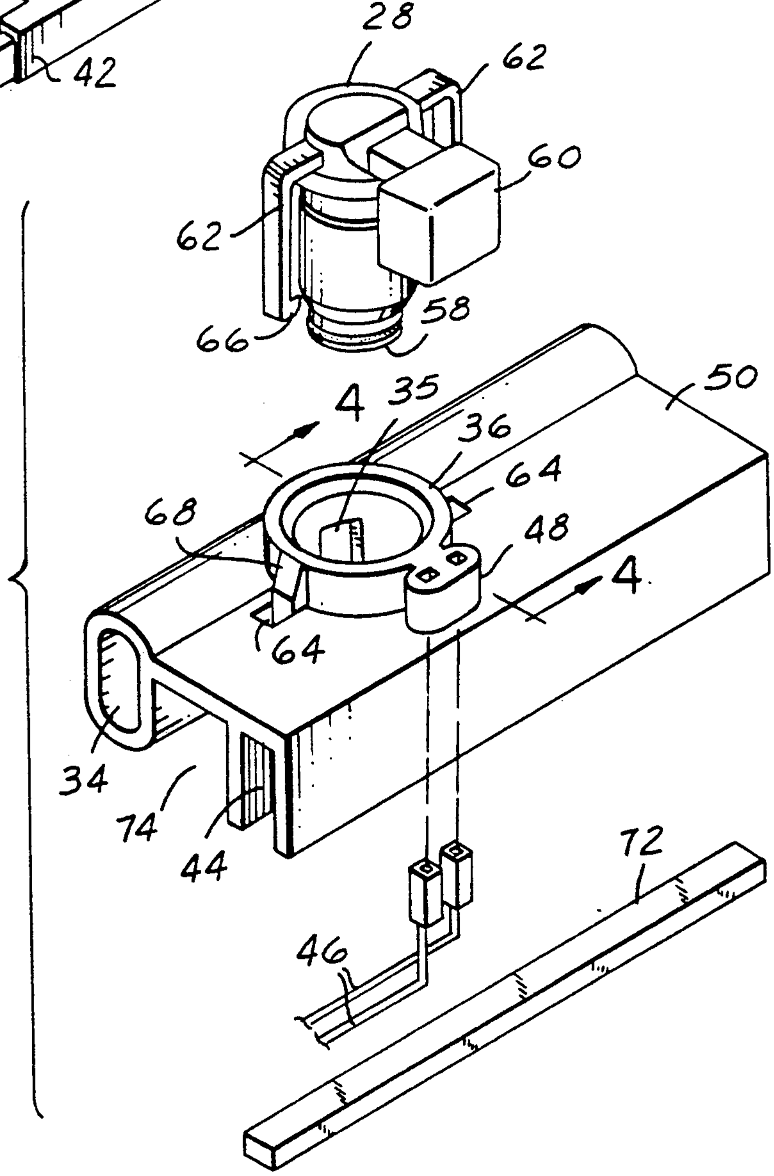
FIG. 2 is an exploded perspective view, on an enlarged scale, of a portion of FIG. 1.
Figure 3:
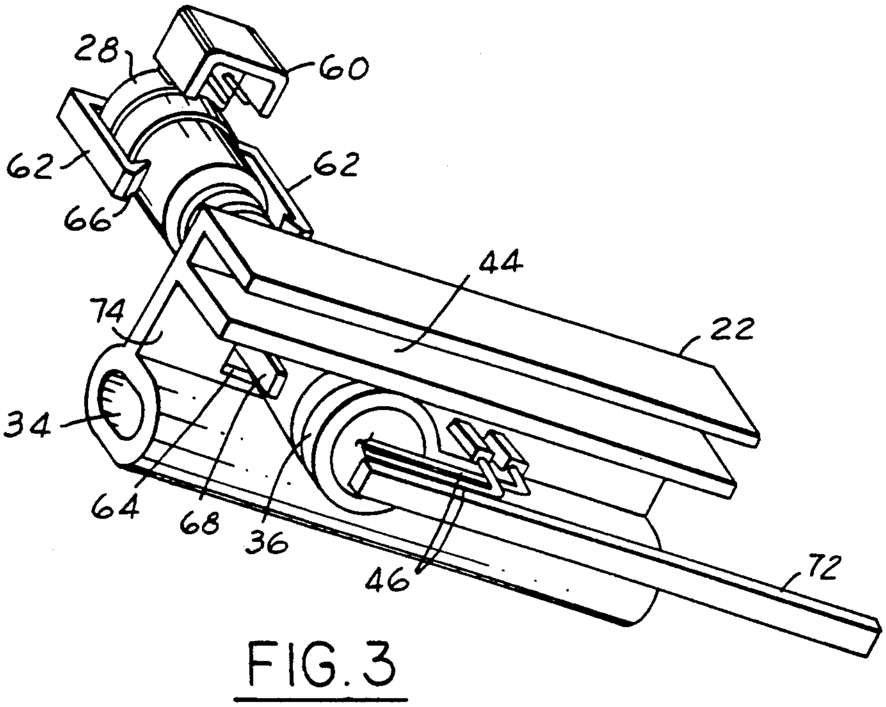
FIG. 3. is a view similar to FIG. 2 but from a different direction.

In both the FIG. 2 and FIG. 5 embodiments, the rail 22 is fabricated by casting or molding procedures. Where production volumes are large, the large tooling costs associated with these processes are justifiable. However, where production volumes are not so large, such costs may be prohibitively expensive. This is where a still further aspect of the invention can come into play. Rather than using a molding or a casting process, the present invention contemplates the fabrication of the major part of the fuel rail by an extrusion process, either metal extrusion or plastic extrusion. An example is presented in FIGS. 6 and 7.

The extruded fuel rail 80 is a generally rectangular bar which has a transverse shape as depicted. A fuel hole 82 extends parallel to the rail's length, and there is a slot 84 also parallel to the rail's length. After having been extruded, transverse through-holes 86 for the injectors 88 and a transverse blind hole 90 for the fuel pressure regulator are machined into the extrusion, and the extrusion is cut to the appropriate length. The sequence of making the transverse holes and cutting the extrusion to length is conducted in accordance with manufacturing considerations. Thereafter, the injectors and pressure regulator are assembled to the rail, the conductors 92 are assembled into slot 84 and enclosed by a cover 94, and inlet and return tubes, such as 96, are attached to the axial ends of the extrusion.

The fuel injector through-holes 86 are constructed with shapes suitable for reception of the injectors and communication with fuel hole 82 so that fuel is delivered to the annular space surrounding the injector fuel inlet(s) without leaking past the two spaced apart O-ring seals. There is a radial notch 98 in the extrusion at the top of each hole 86 to provide a circumferential locator for the injector by circumferential registry of a radial tab 100 of the injector with the notch. The radial tab contains the electrical terminals of the injector, said terminals pointing toward holes 104 at the bottom of the notch which contain the mating terminals of the cable. The hole 86 has an undercut adjacent its top adapted to receive a split-retaining ring 106 to retain the assembled injector in the hole after having been fully inserted therein. The hole for the pressure regulator has a shoulder 108 against which a circumferential flange of the regulator is disposed when fully inserted, and there is an undercut 110 adapted to receive a split-retaining ring 112 to hold the pressure regulator in place. The pressure regulator of course has suitable seals so that fuel does not leak out of the hole.

Figure 8:
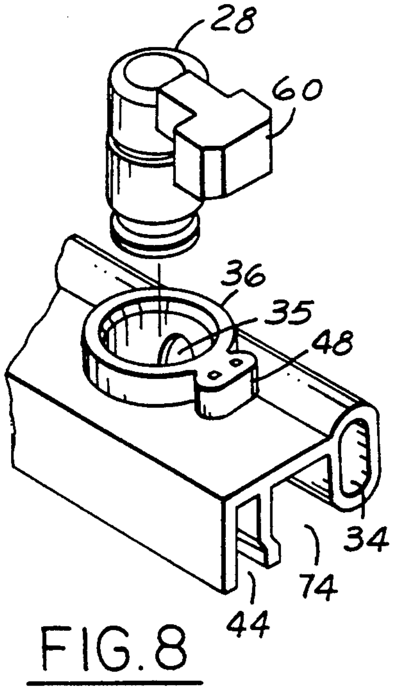
FIG. 8 is a fragmentary view of a fourth embodiment.

FIG. 8 presents an embodiment in which the receptacles 48 are located 90 degrees from their location in FIG. 2. Suitable adaptation of the rail and conductors is made. This placement of the receptacles is useful in making the assembly more compact, and in fact it is even possible to omit the channel-shaped portion 44 by running the conductors in the area 74.

There are many other possible executions of the inventive concept. Variations are can be made to accommodate different engine configurations. In the case of the extruded rail version, end pieces may be assembled onto the ends of the extrusion. Depending upon engine configuration, these end pieces could contain the fuel pressure regulator, inlet and return connections, and electrical connector for plugging to the ECU.

What is claimed is:

1. A method of making a fuel rail for an internal combustion engine which comprises extruding material to a desired transverse shape which includes a hole and a slot, cutting the extruded material to a desired length, machining transverse through-holes in the extruded material to intercept a wall portion of said hole and communicate said hole to each through-hole, machining transverse electrical terminal holes for electrical terminals adjacent each through-hole, assembling conductors to the extruded material by disposing said conductors in said slot and disposing electrical terminals of said conductors in said electrical terminal holes, and assembling fuel injectors to the extruded material by inserting them into said through-holes and concurrently making electrical circuit connection with said electrical terminals in said electrical terminal holes.

2. A method as set forth in claim 1 including the steps of machining, in the extruded material, attachment holes adjacent each through-hole for attachment of each fuel injector, and of engaging attaching portions of said fuel injectors with said attachment holes upon insertion of said fuel injectors into said through-holes.

3. A method of making a fuel rail for an internal combustion engine which comprises extruding material to a desired transverse shape which includes a hole, cutting the extruded material to desired length, machining transverse through-holes in the extruded material to intercept a wall portion of said hole and communicate said hole to each through-hole, and assembling fuel injectors to the extruded material by inserting them into said through-holes, including the steps of machining, in the extruded material, attachment holes adjacent each through-hole for attachment of each fuel injector, and of engaging attaching portions of said fuel injectors with said attachment holes upon insertion of said fuel injectors into said through-holes.

* * * * *